US010449957B2

(12) United States Patent
Nagy et al.

(10) Patent No.: US 10,449,957 B2
(45) Date of Patent: Oct. 22, 2019

(54) SYSTEMS AND METHODS FOR OPERATING AUTONOMOUS VEHICLES USING PERSONALIZED DRIVING PROFILES

(71) Applicant: Robert Bosch GmbH, Stuttgart (DE)

(72) Inventors: Akos Nagy, Mountain View, CA (US); Jan Becker, Palo Alto, CA (US); Shetty Rajaram, Bangalore (IN); Jeorg Vetter, Friesenheim (DE); Christian Kremer, Grossheubach (DE); Tatiana Mamaeva, Munich (DE); Shilpa Gulati, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 15/540,380

(22) PCT Filed: Dec. 29, 2015

(86) PCT No.: PCT/US2015/067868
§ 371 (c)(1),
(2) Date: Jun. 28, 2017

(87) PCT Pub. No.: WO2016/109540
PCT Pub. Date: Jul. 7, 2016

(65) Prior Publication Data
US 2017/0369052 A1 Dec. 28, 2017

Related U.S. Application Data

(60) Provisional application No. 62/098,418, filed on Dec. 31, 2014, provisional application No. 62/097,473, (Continued)

(51) Int. Cl.
B60W 30/09 (2012.01)
B60W 50/10 (2012.01)
(Continued)

(52) U.S. Cl.
CPC ............ B60W 30/09 (2013.01); B60W 30/14 (2013.01); B60W 40/09 (2013.01); B60W 50/08 (2013.01);
(Continued)

(58) Field of Classification Search
CPC ...... B60W 30/09; B60W 50/10; B60W 30/14; B60W 40/09; B60W 50/08; B60W 50/14;
(Continued)

(56) References Cited

U.S. PATENT DOCUMENTS 5,014,200 A 5/1991 Chundrlik et al.
7,158,876 B2 1/2007 Crook
(Continued)

FOREIGN PATENT DOCUMENTS

DE 102011012793 A1 9/2012
DE 102011082480 A1 3/2013
(Continued)

OTHER PUBLICATIONS

Bosch GMBH Robert, DE102011082480A1, Mar. 14, 2013 (Year: 2013).*
(Continued)

Primary Examiner — Frederick M Brushaber
(74) Attorney, Agent, or Firm — Michael Best & Friedrich LLP

(57) ABSTRACT

Systems and methods for controlling an autonomous vehicle. One method includes receiving, with an electronic processor of the autonomous vehicle, a profile selection. The method further includes receiving, with the electronic processor, a driver profile including a plurality of settings based on the profile selection. The method further includes, when the autonomous vehicle is operating in an autonomous driving mode, controlling, with the electronic processor, at least one vehicle control system of the autonomous vehicle
(Continued)

based on at least one of the plurality of settings. The method further includes operating, with the electronic processor, the autonomous vehicle in a manual driving mode. The method further includes receiving, with the electronic processor, data from at least one sensor while the autonomous vehicle operates in the manual driving mode. The method further includes determining, with the electronic processor, a driving style based on the data and adjusting at least one of the plurality of settings based on the driving style.

18 Claims, 9 Drawing Sheets

Related U.S. Application Data filed on Dec. 29, 2014, provisional application No. 62/097,373, filed on Dec. 29, 2014.

(51) Int. Cl.
- *B60W 30/14* (2006.01)
- *B60W 50/08* (2012.01)
- *B60W 50/14* (2012.01)
- *B60W 40/09* (2012.01)

(52) U.S. Cl.
CPC .......... *B60W 50/10* (2013.01); *B60W 50/14* (2013.01); *B60W 2050/146* (2013.01); *B60W 2540/04* (2013.01); *B60W 2540/28* (2013.01); *B60W 2540/30* (2013.01)

(58) Field of Classification Search
CPC ......... B60W 2540/28; B60W 2540/30; B60W 2540/04; B60W 2050/146
See application file for complete search history.

(56) References Cited

U.S. PATENT DOCUMENTS

| | | | |
|---|---|---|---|
| 8,634,822 B2 | 1/2014 | Silver et al. | |
| 8,635,018 B2 | 1/2014 | Chia et al. | |
| 8,930,231 B2 * | 1/2015 | Bowne | G06Q 10/0639 705/4 |
| 9,147,353 B1 * | 9/2015 | Slusar | G09B 19/167 |
| 9,506,763 B2 * | 11/2016 | Averbuch | B60W 50/14 |
| 9,612,123 B1 * | 4/2017 | Levinson | G01C 21/32 |
| 10,077,056 B1 * | 9/2018 | Fields | B60W 40/09 |
| 2003/0195694 A1 | 10/2003 | Kozak et al. | |
| 2008/0167820 A1 | 7/2008 | Oguchi et al. | |
| 2009/0265585 A1 * | 10/2009 | Ikegami | G06F 11/0793 714/46 |
| 2013/0184930 A1 | 7/2013 | Fuehrer | |
| 2013/0328699 A1 | 12/2013 | Schramm et al. | |
| 2015/0338852 A1 * | 11/2015 | Ramanujam | G01C 21/26 701/2 |
| 2015/0339928 A1 * | 11/2015 | Ramanujam | G08G 1/202 701/23 |
| 2017/0088143 A1 * | 3/2017 | Goldman-Shenhar | B60K 35/00 |
| 2017/0123423 A1 * | 5/2017 | Sako | G08G 1/00 |
| 2017/0168689 A1 * | 6/2017 | Goldman-Shenhar | G06F 8/38 |
| 2017/0297586 A1 * | 10/2017 | Li | G05D 1/0088 |
| 2019/0049981 A1 * | 2/2019 | Fischer | G05D 1/0221 |

FOREIGN PATENT DOCUMENTS

| | | |
|---|---|---|
| DE | 102012002581 A1 | 8/2013 |
| DE | 102012024649 A1 | 6/2014 |
| EP | 2752348 A1 | 9/2014 |

OTHER PUBLICATIONS

Daimler AG, DE102012002581A1, Aug. 29, 2013 (Year: 2013).*
Volkswagen, DE102011012793A1, Sep. 6, 2012 (Year: 2012).*
Continental Automotive Systems, EP2752348A1, Jul. 9, 2014 (Year: 2014).*
Valeo Schalter & Sensoren, DE102012024649A1, Jun. 18, 2014 (Year: 2014).*
International Search Report and Written Opinion for Application No. PCT/US2015/067868 dated Apr. 18, 2016, (12 pages).
First Office Action from the National Intellectual Property Administration, P.R. China for Application No. 201580077047.0 dated Feb. 26, 2019 (14 pages).

* cited by examiner

SYSTEMS AND METHODS FOR OPERATING AUTONOMOUS VEHICLES USING PERSONALIZED DRIVING PROFILES

RELATED APPLICATIONS

This application claims the benefit of U.S. Provisional Application No. 62/097,373, entitled "USER PROFILE AND PERSONALIZATION OF PARAMETERS OF AN AUTOMATED VEHICLE," filed Dec. 29, 2014; U.S. Provisional Application No. 62/097,473, entitled "INTERACTIVE LEARNING OF DRIVING STYLE FOR AUTOMATED VEHICLES," filed Dec. 29, 2014; and U.S. Provisional Application No. 62/098,418, entitled "PERSONALIZED AUTOMATED DRIVING VEHICLES USING DRIVER FEEDBACK," filed Dec. 31, 2014; the entire contents of which are all incorporated herein by reference.

FIELD

Embodiments of the invention relate to the field of automated vehicle control systems.

BACKGROUND

Driver assistance systems such as, for example, adaptive cruise control and automated lane change systems have been successfully deployed to the market to increase driver comfort and safety. As these driver assistance systems progress in sophistication, less driver interaction may be required. In some cases, the driver assistance systems may be fully automated for portions of a trip. Accordingly, the role of the driver has changed from that of an active driver to that of a passenger for at least some duration of the trip. Highly automated vehicles allow the driver to hand over control to the automated vehicle and to do other tasks while driving.

SUMMARY

One exemplary embodiment provides a method for controlling an autonomous vehicle. The method includes receiving, with an electronic processor of the autonomous vehicle, a profile selection. The method further includes receiving, with the electronic processor, a driver profile including a plurality of settings based on the profile selection. The method further includes, when the autonomous vehicle is operating in an autonomous driving mode, controlling, with the electronic processor, at least one vehicle control system of the autonomous vehicle based on at least one of the plurality of settings. The method further includes operating, with the electronic processor, the autonomous vehicle in a manual driving mode. The method further includes receiving, with the electronic processor, data from at least one sensor while the autonomous vehicle operates in the manual driving mode. The method further includes determining, with the electronic processor, a driving style based on the data and adjusting, with the electronic processor, at least one of the plurality of settings based on the driving style.

Another embodiment provides a system for controlling an autonomous vehicle. The system includes at least one vehicle control system and an electronic controller electrically coupled to the at least one vehicle control system. The electronic controller includes an electronic processor configured to receive profile selection, receive a driver profile including a plurality of settings based on the profile selection, and, when the autonomous vehicle is operating in an autonomous driving mode, control the at least one vehicle control system based on at least one of the plurality of settings.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
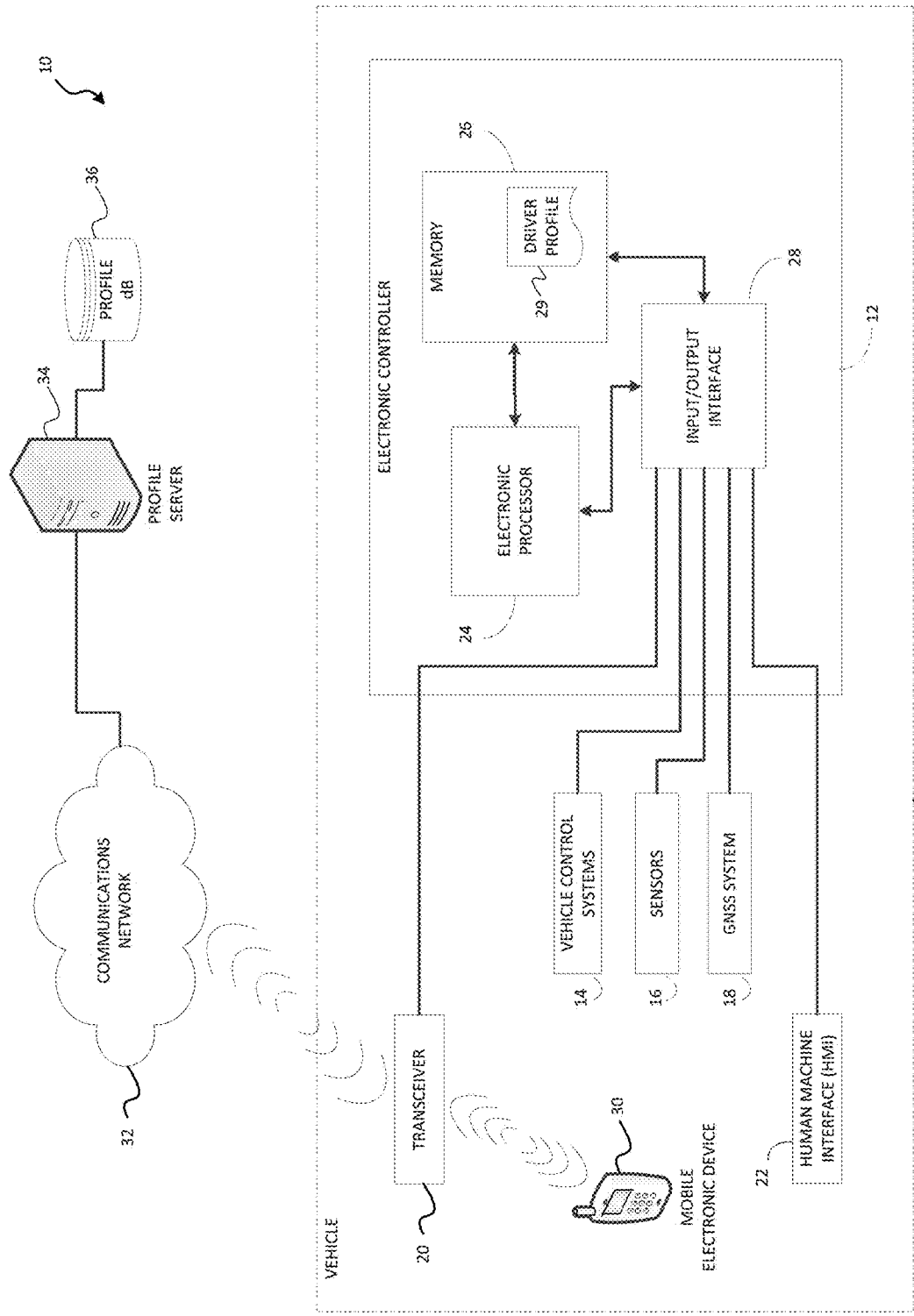
FIG. 1 is a block diagram of an autonomous vehicle control system in accordance with some embodiments.
Figure 2B:
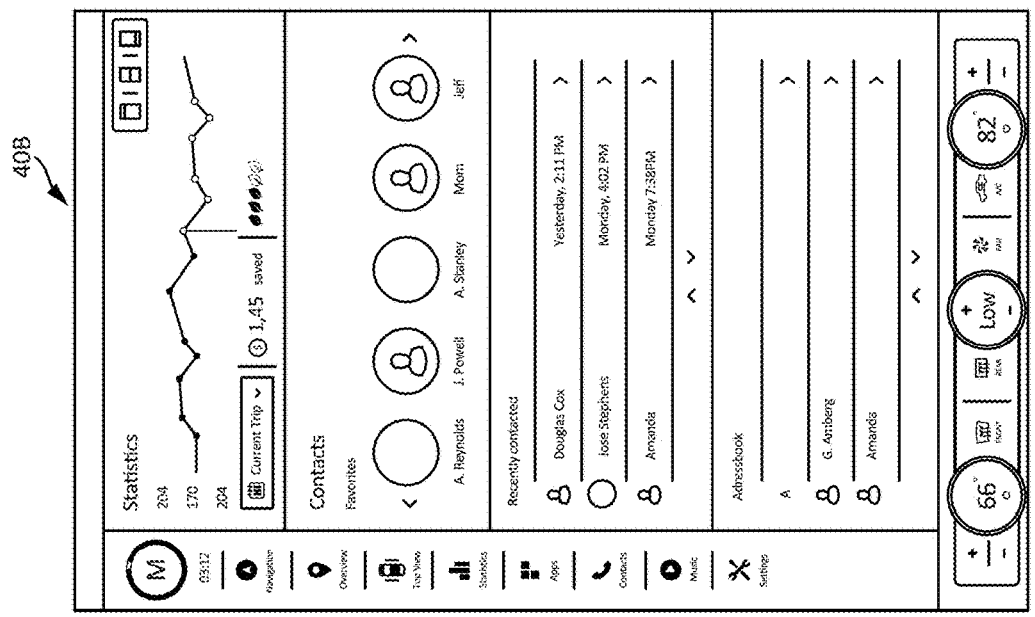
FIGS. 2A-2D illustrate exemplary embodiments of settings management screens in accordance with some embodiments.
Figure 2A:
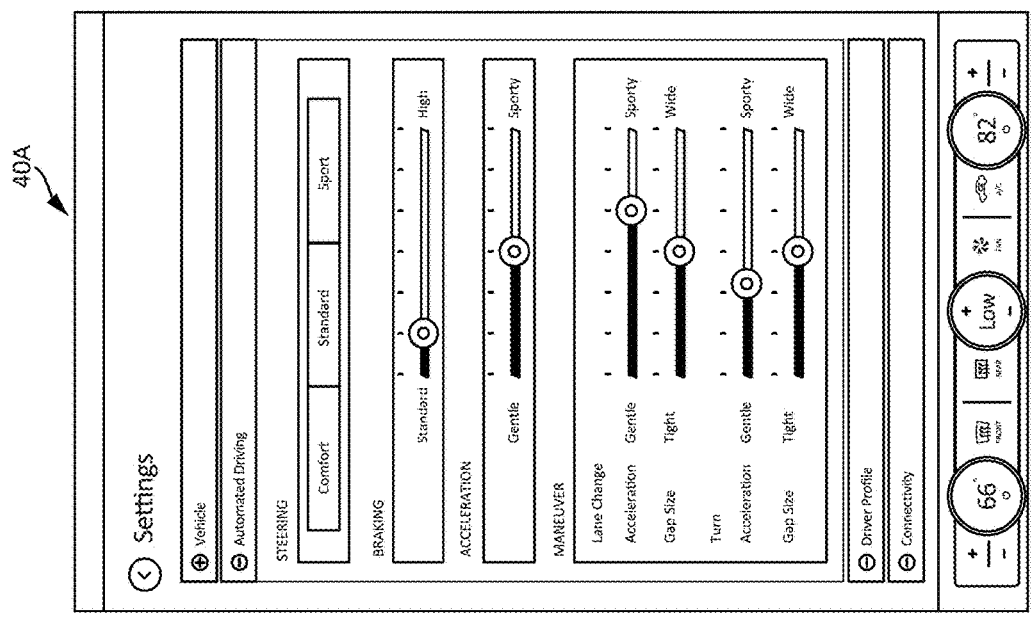
Figure 2D:
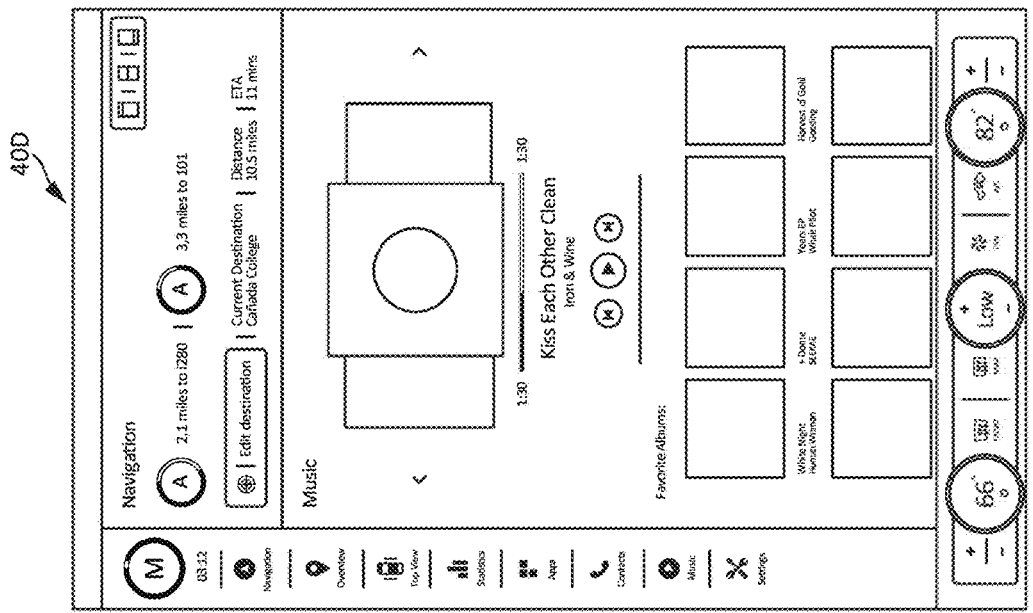
Figure 2C:
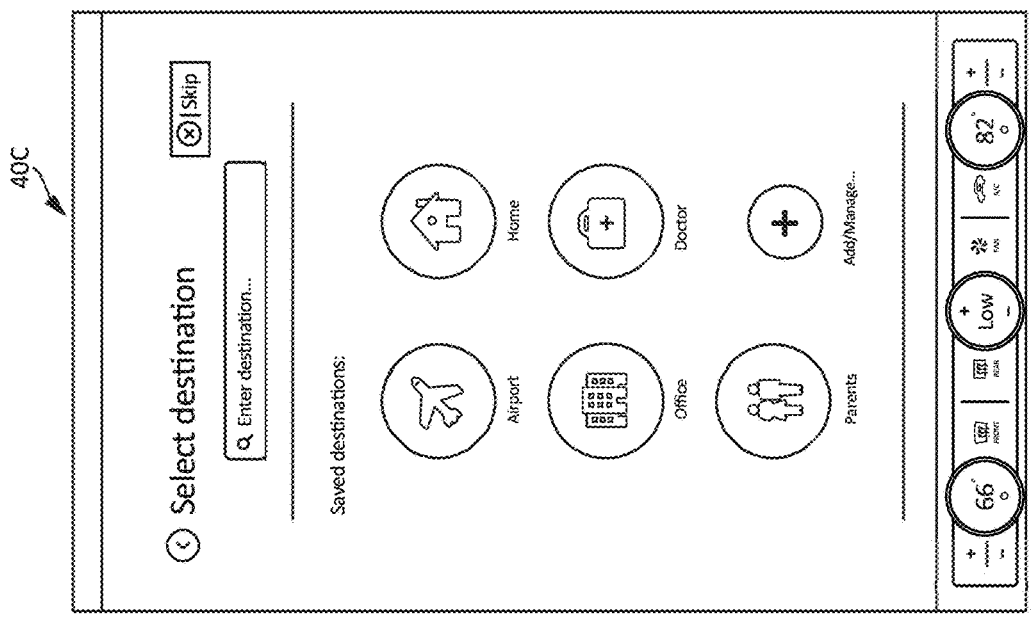

FIG. 1 is a block diagram of one exemplary embodiment of an autonomous vehicle control system 10. As described more particularly below, the autonomous vehicle control system 10 may be mounted on, or integrated into, an autonomous vehicle 11 and autonomously drives the autonomous vehicle 11. It should be noted that, in the description that follows, the terms "vehicle," "autonomous vehicle" and "automated vehicle" should not be considered limiting. The terms are used in a general way to refer to an autonomous or automated driving vehicle, which possesses varying degrees of automation (i.e., the vehicle is configured to drive itself with limited, or in some cases no, input from a driver). The systems and methods described herein may be used with any vehicle capable of operating partially or fully autonomously, being controlled manually by a driver, or some combination of both.

The term "driver," as used herein, generally refers to an occupant of an autonomous vehicle who is seated in the driver's position, operates the controls of the vehicle while in a manual mode, or provides control input to the vehicle to influence the autonomous operation of the vehicle. The term "passenger," as used herein, generally refers to an occupant of an autonomous vehicle who passively rides in the vehicle without controlling the driving operations of the vehicle. However, both the driver and passenger of an autonomous vehicle may share some of the other's role. For example, the driver may hand over the driving controls to the autonomous vehicle control system 10 and ride in the vehicle as a passenger for some or all of a trip.

The term "trip," as used herein, refers to the driving (manually or autonomously) of a vehicle from a starting point to a final destination point, with or without one or more waypoints in between. For example, a trip may start at a driver's home (i.e., the starting point), include a stop to pick up a passenger at the passenger's home (i.e., a waypoint), and continue to the workplace of the driver and the passenger (i.e., the destination).

In the example illustrated, the autonomous vehicle control system 10 includes an electronic controller 12, vehicle control systems 14, sensors 16, a GNSS (global navigational satellite system) system 18, a transceiver 20, and a human machine interface (HMI) 22. The components of the autonomous vehicle control system 10, along with other various modules and components are electrically coupled to each other by or through one or more control or data buses, which enable communication therebetween. The use of control and data buses for the interconnection between, and communication among, the various modules and components would be known to a person skilled in the art in view of the invention described herein. In alternative embodiments, some or all of the components of the autonomous vehicle control system 10 may be communicatively coupled using suitable wireless modalities (for example, Bluetooth™ or near field communication). For ease of description, the autonomous vehicle control system 10 illustrated in FIG. 1 includes one of each of the foregoing components. Alternative embodiments may include one or more of each component, or may exclude or combine some components. The electronic controller 12 controls the vehicle control systems 14, sensors 16, GNSS system 18, transceiver 20, and human machine interface (HMI) 22 to autonomously control the vehicle according to the methods described herein. In some embodiments, the electronic controller 12 controls the vehicle control systems 14, sensors 16, GNSS system 18, transceiver 20, human machine interface 22 by transmitting control signals or instructions to these devices and systems.

The electronic controller 12 includes an electronic processor 24 (e.g., a microprocessor, application specific integrated circuit, etc.), a memory 26, and an input/output interface 28. The memory 26 may be made up of one or more non-transitory computer-readable media, and includes at least a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. The electronic processor 24 is coupled to the memory 26 and the input/output interface 28. The electronic processor 24 sends and receives information (e.g., from the memory 26 and/or the input/output interface 28), and processes the information by executing one or more software instructions or modules, capable of being stored in the memory 26, or another non-transitory computer readable medium. The software can include firmware, one or more applications, program data, filters, rules, one or more program modules, and other executable instructions. The electronic processor 24 is configured to retrieve from the memory 26 and execute, among other things, software for autonomous vehicle control, and for performing methods as described herein. The data storage area of the memory 26 includes a driver profile 29, which can be accessed or changed by the electronic processor 24. The driver profile 29 is described in greater detail below.

The input/output interface 28 transmits and receives information from devices external to the electronic controller 12 (e.g., over one or more wired and/or wireless connections), such as the vehicle control systems 14, the sensors 16, the GNSS system 18, the transceiver 20, and the HMI 22. The input/output interface 28 receives user input, provides system output, or a combination of both. As described herein, user input from a driver or passenger of a vehicle may be provided via, for example, the HMI 22. The input/output interface 28 may also include other input and output mechanisms, which for brevity are not described herein and which may be implemented in hardware, software, or a combination of both.

In one exemplary embodiment, the electronic controller 12 performs machine learning functions. For example, the memory 26 of the electronic controller 12 may store one or more learning engines executable by the electronic processor 24. Machine learning generally refers to the ability of a computer application to learn without being explicitly programmed. In particular, a computer application performing machine learning (sometimes referred to as a machine learning engine) is configured to develop an algorithm based on training data. For example, as described in greater detail below, a learning engine may use data collected when a driver operates the autonomous vehicle 11 (i.e., training data) to develop a model, which is used by the electronic controller 12 to operate the autonomous vehicle 11. Machine learning can be performed using various types of methods and mechanisms including, but not limited to, decision tree learning, association rule learning, artificial neural networks, inductive logic programming, support vector machines, clustering, Bayesian networks, reinforcement learning, representation learning, similarity and metric learning, sparse dictionary learning, and genetic algorithms.

It should be understood that although FIG. 1 illustrates only a single electronic processor 24, memory 26, and input/output interface 28, alternative embodiments of the electronic controller 12 may include multiple processing units, memory modules, and/or input/output interfaces. It should also be noted that the autonomous vehicle control system 10 may include other electronic controllers, each including similar components as, and configured similarly to, the electronic controller 12. In some embodiments, the electronic controller 12 is implemented partially or entirely on a semiconductor (e.g., a field-programmable gate array ["FPGA"] semiconductor) chip. Similarly, the various modules and controllers described herein may be implemented as individual controllers, as illustrated, or as components of a single controller. In some embodiments, a combination of approaches may be used.

The electronic processor 24 uses the input/output interface 28 to send and receive information or commands to and from the vehicle control systems 14 (e.g., over a vehicle communication bus, such as a CAN bus). The vehicle control systems 14 include components (e.g., actuators, motors, and controllers) to control a plurality of vehicle systems (e.g., braking, steering, and engine power output). For the sake of brevity, the vehicle control systems 14 will not be described in greater detail. The electronic processor 24 controls the vehicle control systems 14 to autonomously drive the autonomous vehicle 11. In some embodiments, the vehicle control systems 14 are controlled to automatically drive the autonomous vehicle 11 without driver intervention or input for the entirety of a trip. In other embodiments, the vehicle control systems 14 are controlled to drive the autonomous vehicle 11 for a portion of a trip, and to allow or require a driver to manually operate the vehicle for one or more portions of the trip.

The sensors 16 are coupled to the electronic controller 12 and determine one or more attributes of the autonomous vehicle 11. The sensors 16 communicate information regarding those attributes to the electronic controller 12 using, for example, electrical signals. The vehicle attributes include, for example, the position of the autonomous vehicle 11 or portions or components of the autonomous vehicle 11, the movement of the autonomous vehicle 11 or portions or components of the autonomous vehicle 11, the forces acting on the autonomous vehicle 11 or portions or components of the autonomous vehicle 11, and the proximity of the autonomous vehicle 11 to other vehicles or objects (stationary or moving). The sensors 16 may include, for example, vehicle control sensors (e.g., sensors that detect accelerator pedal position, brake pedal position, and steering wheel position [steering angle]), wheel speed sensors, vehicle speed sensors, yaw sensors, force sensors, odometry sensors, and vehicle proximity sensors (e.g., camera, radar, ultrasonic). The electronic controller 12 receives and interprets the signals received from the sensors 16 to determine values for one or more vehicle attributes, including, for example, vehicle speed, steering angle, vehicle position, pitch, yaw, and roll. The electronic controller 12 controls the vehicle control systems 14 to autonomously control the autonomous vehicle 11 (for example, by generating braking signals, acceleration signals, steering signals) based at least in part on the information received from the sensors 16. Some of the sensors 16 may be integrated into the vehicle control systems 14, while others may be deployed on the vehicle 11 separately from the vehicle control systems 14.

The GNSS (global navigation satellite system) system 18 receives radiofrequency signals from orbiting satellites using one or more antennas and receivers (not shown). The GNSS system 18 determines geo-spatial positioning (i.e., latitude, longitude, altitude, and speed) for the vehicle based on the received radiofrequency signals. The GNSS system 18 communicates this positioning information to the electronic controller 12. The electronic controller 12 may use this information in conjunction with, or in place of, information received from the sensors 16 when controlling the autonomous vehicle 11. The electronic controller 12 controls the GNSS system 18 to plan routes and navigate the autonomous vehicle 11. GNSS systems are known, and will not be described in greater detail. In some embodiments, the GNSS system 18 may operate using the GPS (global positioning system). Alternative embodiments may use a regional satellite navigation system, and/or a land-based navigation system in conjunction with, or in place of, the GNSS system 18.

The transceiver 20 is a radio transceiver communicating data over one or more wireless communications networks, such as, for example, cellular networks and land mobile radio networks. The transceiver 20 also provides wireless communications within the vehicle 11 using suitable network modalities (e.g., Bluetooth™, near field communication, Wi-Fi™, and the like). Accordingly, the transceiver 20 communicatively couples the electronic controller 12 and other components of the autonomous vehicle control system 10 with networks or electronic devices both inside and outside the autonomous vehicle 11. The transceiver 20 includes other components that enable wireless communication (e.g., amplifiers, antennas, baseband processors, and the like), which for brevity are not described herein and which may be implemented in hardware, software, or a combination of both. Some embodiments include multiple transceivers, or separate transmitting and receiving components, for example, a transmitter and a receiver, instead of a combined transceiver 20.

The human machine interface (HMI) 22 provides an interface between the autonomous vehicle control system 10 and the driver. The HMI 22 is electrically coupled to the electronic controller 12 and receives input from the driver, receives information from the electronic controller 12, and provides feedback (e.g., audio, visual, haptic. or a combination thereof) to the driver based on the received information. The HMI 22 provides suitable input mechanisms, such as a button, a touch-screen display having menu options, voice recognition, etc., for receive inputs from the driver that may be used by the electronic controller 12 to control the vehicle 11.

The HMI 22 provides visual output such as, for example, graphical indicators (i.e., fixed or animated icons), lights, colors, text, images, combinations of the foregoing, and the like. The HMI 22 includes a suitable display mechanism for displaying the visual output, for example, an instrument cluster, a mirror, a heads-up display, a center console display screen (for example, a liquid crystal display (LCD) touch screen, or an organic light-emitting diode (OLED) touch screen), or through other suitable mechanisms. In alterative embodiments, the display screen may not be a touch screen. In some embodiments, the HMI 22 includes a graphical user interface (GUI) (for example, generated by the electronic processor 24, from instructions and data stored in the memory 26, and presented on the display screen) that enables a user to interact with the autonomous vehicle control system 10. The HMI 22 may also provide output to the driver such as a chime, buzzer, voice output, or other suitable sound through a speaker included in the HMI 22 or separate from the HMI 22. In some embodiments, HMI 22 provides haptic outputs to the driver by vibrating one or more vehicle components (e.g., the vehicle's steering wheel and the driver's seat), such as through the use of a vibration motor. In some embodiments, HMI 22 provides a combination of visual, audio, and haptic outputs.

In some embodiments, the autonomous vehicle control system 10 also includes a mobile electronic device 30, a communications network 32, a profile server 34, and a profile database 36. As illustrated in FIG. 1, the mobile electronic device 30, the communications network 32, and the profile server 34 are communicatively coupled via the transceiver 20 and other suitable network components (not shown). For ease of description, the exemplary embodiment illustrated in FIG. 1 includes one of each of the mobile electronic device 30, the communications network 32, the profile server 34, and the profile database 36. Alternative embodiments may include one or more of each component or may exclude or combine some components.

The mobile electronic device 30 is communicatively coupled to the transceiver 20 and wirelessly communicates with the electronic controller 12 and other components of autonomous vehicle control system 10 using suitable wireless network modalities (e.g., Bluetooth™, near field communication (NFC), Wi-Fi™, and the like). In alternative embodiments, the mobile electronic device 30 may be communicatively coupled to the electronic controller 12 via a wired connection using, for example, a universal serial bus (USB) connection or similar connection.

As illustrated, the mobile electronic device 30 is a smart telephone. In alternative embodiments, the mobile electronic device 30 may be, for example, a tablet computer, personal digital assistant (PDA), smart watch, or any other portable or wearable electronic device that includes, or can be connected to, a network modem or similar components that enables wireless or wired communications (e.g., a processor, memory, i/o interface, transceiver, antenna, and the like). In some embodiments, the HMI 22 communicates with the mobile electronic device 30 to provide the visual, audio, and haptic outputs described above through the mobile electronic device 30 when the mobile electronic device 30 is communicatively coupled to the autonomous vehicle control system 10.

The transceiver 20 may also communicatively couple the electronic controller 12 with the communications network 32. The communications network 32 may include one or more cellular networks (e.g., long term evolution (LTE), Time Division Multiple Access (TDMA), and Code Division Multiple Access (CDMA)), land-mobile radio networks, and other local and wide area data networks (e.g., Worldwide Interoperability for Microwave Access (WiMax)). Portions of the communications network 32 may switch or route network traffic, including voice telephone calls (e.g., cellular and landline calls), digital and analog radio communications, voice over internet protocol (VoIP), short message service (SMS) messages and multimedia message service (MMS) messages ("text messages"), transmission control protocol/internet protocol (TCP/IP) data traffic, and the like through one or more connections to a public switched telephone network (PSTN), the Internet, or both.

The profile server 34 is also communicatively coupled to the communications network 32. The profile server 34 includes, among other things, an electronic processor (e.g., a microprocessor or another suitable programmable device), a memory (i.e., a computer-readable storage medium), and an input/output interface (not shown). The electronic processor, the memory, and the input/output interface, as well as the other various modules are connected by one or more control or data buses, the use of which would be known to a person skilled in the art in view of the invention described herein. The memory of the profile server 34 stores software (e.g., firmware, one or more applications, program data, filters, rules, one or more program modules, and/or other executable instructions), which includes instructions for operating the profile server 34 as described herein.

The profile database 36 electronically stores information regarding the operation of the autonomous vehicle control system 10, including, for example, the driver profile 29. The profile server 34 reads and writes such information to and from the profile database 36. In the illustrated embodiment, the profile database 36 is a database housed on a suitable database server and accessible by the profile server 34 and other systems (not shown) over the communications network 32. In alternative embodiments, the profile database 36 may be located within the profile server 34 or on a system external to the communications network 32 and accessible over one or more intervening networks. In some embodiments, the profile server 34 sends and receives, to and from the electronic controller 12 (e.g., via the communications network 32), the driver profile 29. For ease of description, exemplary embodiments described herein are generally described in terms of a single driver profile 29. This should not be considered limiting; alternative embodiments may include one or more instances of the driver profile 29, stored in, for example, the memory 26, the profile database 36, the mobile electronic device 30, or combinations of the foregoing.

An autonomous vehicle may have more than one driver. For example, a family that operates an autonomous vehicle may have two adult drivers and one or more teenage drivers. A fleet vehicle may have many drivers within an organization. Friends and family may share or borrow one another's vehicles. Each driver may have different preferences or needs when driving an autonomous vehicle. For example, one driver may prefer a sportier driving style, another driver may prefer a more relaxed driving style, and still another driver may prefer that the vehicle operate as economically as possible. Accordingly, the electronic controller 12 uses the driver profile 29 to adapt the driving style of the autonomous vehicle 11 to the preferences of the driver.

The driver profile 29 includes information, including a plurality of settings, relating to, or defining aspects of, the operation of the autonomous vehicle 11. The plurality of settings may include, for example, preferences for stronger or weaker acceleration, for faster or slower driving through curves, for cutting or not cutting curves, for harder or softer braking, for following distance, for gap sizes between other vehicles during certain maneuvers, and the like. The driver profile 29 can include settings for almost any driving characteristic, bounded by applicable safety standards and laws.

In some embodiments, the driver profile 29 also includes other settings and preferences, such as, for example, a driver's contact database and calendar, navigational preferences (e.g., for use with the GNSS system 18), entertainment preferences (e.g., music playlists, radio station pre-sets, and the like), vehicle environmental preferences (e.g., desired cabin temperature), driver position preferences (e.g., seat position, steering wheel position, pedal position, and mirror position), and the like. In some embodiments, the electronic controller 12 may access profile information (e.g., driver's calendar entries, appointments and addresses) to help provide a forward-looking or context sensitive display on the HMI 22. Such data might be used to help plan routes or provide easier access to relevant points of interest. For example, the electronic controller 12 may suggest a route based on the locations of appointments on the driver's schedule. In some embodiments, the driver profile 29 is linked to other online accounts, such as social media accounts. In such embodiments, the electronic controller 12 may access and use information in the linked accounts to provide or augment the forward-looking or context sensitive display described above or to control other suitable functions of the autonomous vehicle 11. The electronic controller 12 may also use information in the linked accounts to control other functions of the autonomous vehicle 11 (e.g., entertainment systems, communications systems, navigation systems, and the like).

As illustrated in FIGS. 2A-2D, the settings stored in the driver profile 29 may be viewed and edited via the HMI 22, using, for example, settings management screens 40A-40D. In some embodiments, the information stored in the driver profile 29 may also be viewed and edited through an Internet website (e.g., provided by or with the profile server 34), an application on the mobile electronic device 30, or another suitable device. In some embodiments, the driver profile 29 is protected using suitable data security measures (e.g., encryption).

In the illustrated embodiment, the driver profile 29 is stored the memory 26 of the electronic controller 12. In alternative embodiments, the driver profile 29 may also be stored in the profile database 36, on the mobile electronic device 30, in an Internet or private network cloud-based storage mechanism, or in another electronic memory accessible by the electronic controller 12. Accordingly, a driver's profile may follow the driver as he or she uses different vehicles.

Figure 3:
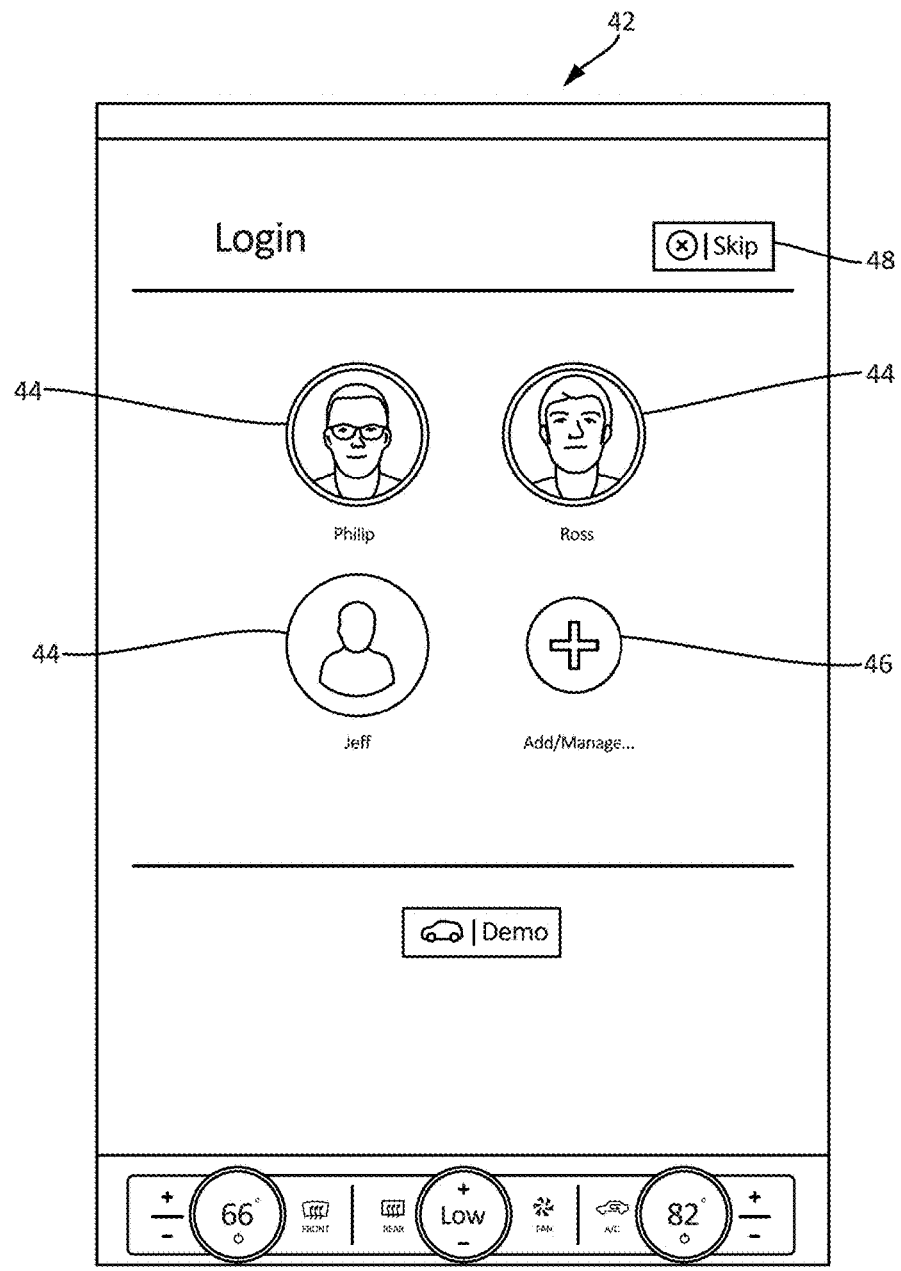
FIG. 3 illustrates an exemplary embodiment of a profile selection screen in accordance with some embodiments.

In one exemplary embodiment, the autonomous vehicle 11 prompts the driver to selects his or her profile (i.e., the driver profile 29). As illustrated in FIG. 3, the driver may select the driver profile 29 using, for example, a profile selection screen 42, displayed by the HMI 22. For example, a driver may select his or her profile using one of the profile selector buttons 44. Alternatively, a driver without an existing profile may choose to create a new profile using the profile management button 46 or may choose to operate the autonomous vehicle 11 without using a driver profile 29 by selecting the skip button 48. Alternative embodiments may use other mechanisms of selecting a driver profile 29. For example, profile selection can also be made using the mobile electronic device 30. In some embodiments, the driver profile 29 is linked to a specific electronic key or key fob. Alternative embodiments may use a biometric identifier (e.g., fingerprints, voice prints, and facial recognition) for profile selection.

As noted above, a driver may create a new driver profile 29 using the HMI 22. A new driver profile 29 may also be created using an Internet website (e.g., provided by or with the profile server 34), an application on the mobile electronic device 30, or automatically by the electronic controller 12 when a new or unknown driver begins operating the autonomous vehicle 11. A new profile may be pre-populated with example settings and preferences (based on, for example, average driver preferences or maximum fuel economy), or a new profile may be empty. In some embodiments, the plurality of settings for a new (empty) driver profile 29 may be entered by the driver (see FIG. 5) or determined automatically by the electronic controller 12. For example, the electronic controller 12 may automatically determine the plurality of settings based on driving styles exhibited by the driver operating the autonomous vehicle 11 in manual mode, based on input provided by the driver while the autonomous vehicle 11 operates in autonomous mode, or a combination of both.

Figure 4:
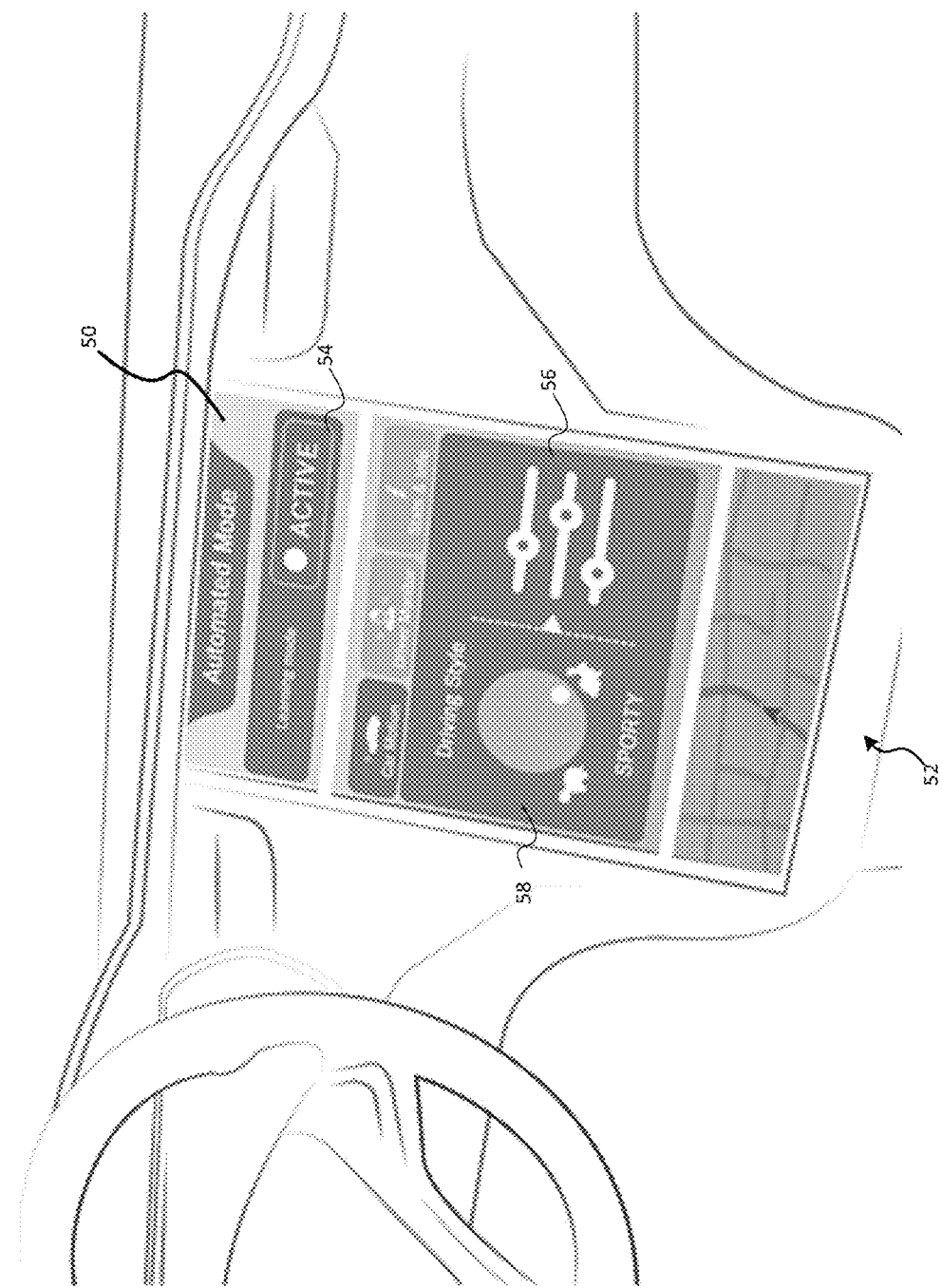
FIG. 4 illustrates an exemplary embodiment of a learning mode display screen in accordance with some embodiments.

In one exemplary embodiment, the autonomous vehicle 11 learns from the driver's driving maneuvers during manual driving mode and applies the same motion behaviors to the autonomous driving mode. FIG. 4 illustrates an exemplary embodiment of a learning mode display screen 50, displayed on a center console 52 of the autonomous vehicle 11. The learning mode display screen 50 includes an active learning mode indicator 54 to indicate that the autonomous vehicle control system 10 is in learning mode. When the autonomous vehicle control system 10 is in the learning mode, the electronic controller 12 monitors the driver's style of driving using the sensors 16, feedback from the vehicle control systems 14, and information from the GNSS system 18. The electronic controller 12 thus gathers data describing the driving style of the driver based on the driver's maneuvers. Such data includes, for example, an average following distance, a minimum following distance, a maximum lateral acceleration, an average lateral acceleration, a maximum longitudinal acceleration, an average longitudinal acceleration, and other aspects of vehicle control. This data is recorded in the memory 26 of the electronic controller 12.

The electronic processor 24 uses this data and machine learning functions to determine a driving style for the driver. The driving style may be categorized based on a prototypical driver's habits, for example, sporty, relaxed, aggressive, or passive. The electronic processor 24 stores the driving style and the vehicle settings that characterize the style in the driver profile 29. In some embodiments, the driving style is used to initially populate an empty (i.e., newly created) profile. In some embodiments, the driver profile 29 is updated each time learning mode is enabled (e.g., each time the autonomous vehicle 11 is driven manually). In some embodiments, the driver profile 29 is updated (adjusted) by replacing existing settings with new settings, which are based on the driving style as most recently determined. In other embodiments, the driver profile 29 is updated by making incremental adjustments based on the driving style as most recently determined. As such, the electronic controller 12 may adjust the driver profile 29 gradually over time as driver habits change. For example, after a single outing of aggressive driving, a driver profile 29 that generally reflects a passive driving style may only be adjusted to be 10% more aggressive.

As noted above, the autonomous vehicle control system 10 uses the driver profile 29 to control the autonomous vehicle 11. Accordingly, the electronic controller 12 controls the autonomous vehicle 11 to drive in ways that mimic, or at least are based on, the driver's style. For example, if the driver typically accelerates quickly, autonomous vehicle control system 10, while in autonomous driving mode, accelerates quickly. In another example, the driver may typically round a curve at a speed that imparts a comfortable level of lateral acceleration on the driver. Accordingly, the autonomous vehicle control system 10, while in autonomous driving mode, controls the speed of the autonomous vehicle 11 to impart a similar level of lateral acceleration on the driver. As noted above, the autonomous vehicle control system 10 may be configured to maintain compliance with applicable laws and regulations.

In some embodiments, the autonomous vehicle control system 10 automatically adjusts the plurality of settings in the driver profile 29 based on external factors. In some embodiments, the autonomous vehicle control system 10 may detect road or weather conditions and adjust the control of the autonomous vehicle 11 based on these conditions. In some embodiments, the autonomous vehicle control system 10 may detect the driver's current activity (e.g., for example, using an interior camera system, using the HMI 22, or through other suitable mechanisms) and modify the control of the autonomous vehicle 11 accordingly. For example, the driver profile 29 may include more aggressive driving settings, which may not be desirable while a driver is reading or writing while the autonomous vehicle 11 is in autonomous driving mode. Accordingly, the electronic controller 12 may control the vehicle less aggressively, but still similar to the driving style indicated by the driver profile 29.

In some cases, a driver may prefer to manually drive the autonomous vehicle 11 using one style, but may prefer being driven by the vehicle (i.e., in autonomous mode) in style which differs from his or her own manual driving. For example, a driver may manually drive the autonomous vehicle 11 in an aggressive or sporty driving style but may prefer being driven in a more comfortable or relaxed way. Accordingly, exemplary embodiments of the autonomous vehicle control system 10 update the learned driving style and the vehicle settings in the driver profile 29 based on feedback received from the driver (e.g., driver inputs).

In some embodiments, the autonomous vehicle control system 10 receives driver preference inputs, in response to the overall performance of the autonomous vehicle 11, regarding driver preferences that are used to adjust specific learned settings. For example, as illustrated in FIG. 4, the active learning mode indicator 54 indicates that the autonomous vehicle control system 10 is in learning mode. The learning mode display screen 50 also prompts the driver for feedback using slider controls 56 and a dial control 58. The slider controls 56 receive driver preference input on steering characteristics (e.g., comfort, standard, and sporty), braking, acceleration, gap size, preferred following distance during ordinary driving, tolerable deviation from posted speeds before passing, and the like. The dial control 58 receives driver preference input regarding how sporty or aggressively the autonomous vehicle 11 should operate in general. The slider controls 56 and dial control 58 may allow the driver to make smooth and continuous adjustments of values (e.g., acceleration values, gap size values, and the like) or may allow to driver to select from a number of discrete values within a range.

Figure 5:
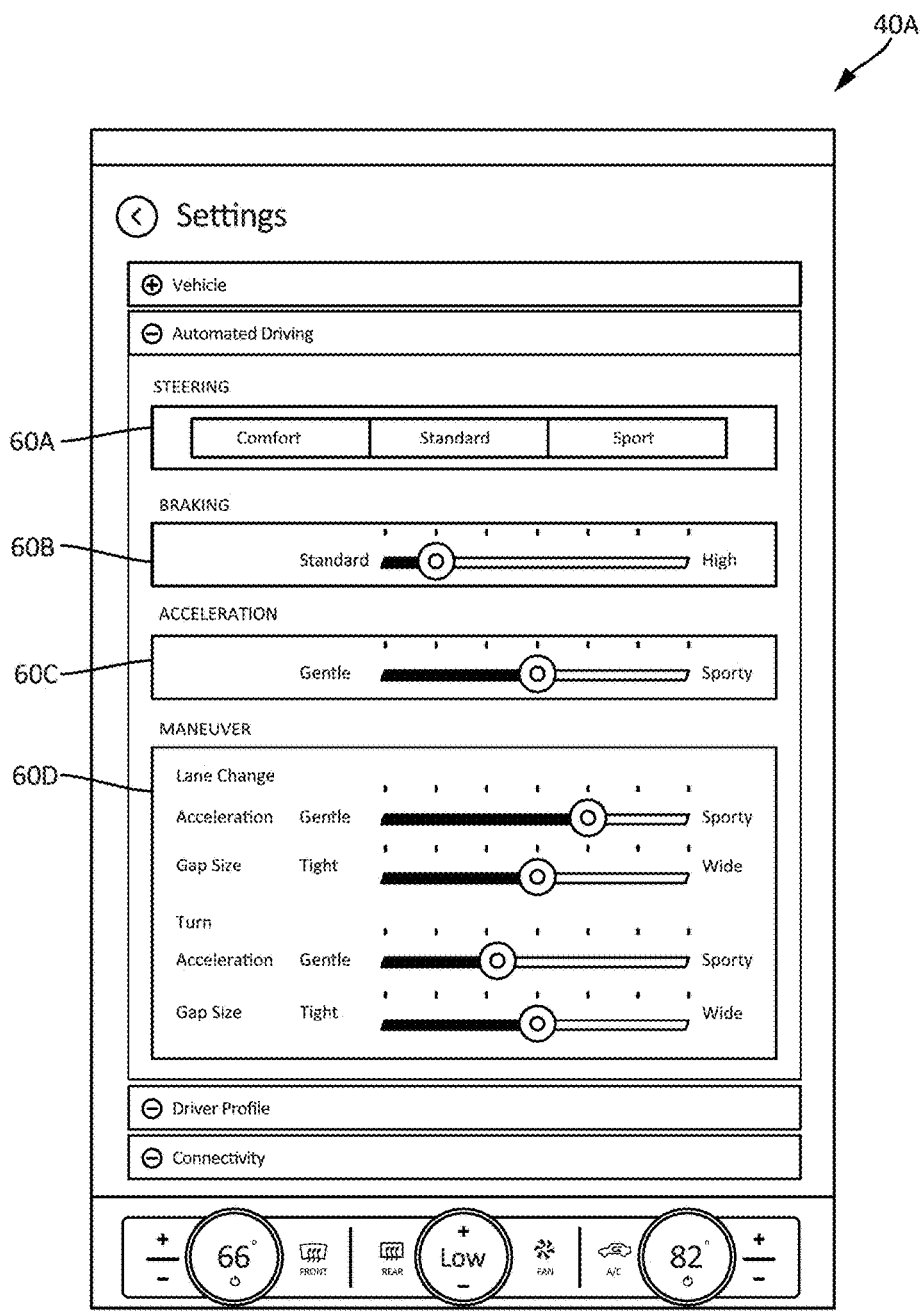
FIG. 5 illustrates an exemplary embodiment of a settings management screen in accordance with some embodiments.

In another example, illustrated in FIG. 5, the electronic controller 12 receives driver feedback input from the settings management screen 40A via feedback selectors 60A-60B, which receive inputs similar to those described above in relation to FIG. 4. As illustrated, feedback selector 60A uses buttons, and feedback selectors 60B-60D use slider controls to receive input. Alternative embodiments of the learning mode display screen 50 and the settings management screen 40A may use other input elements or may receive driver feedback input on other driving characteristics.

Figure 6:
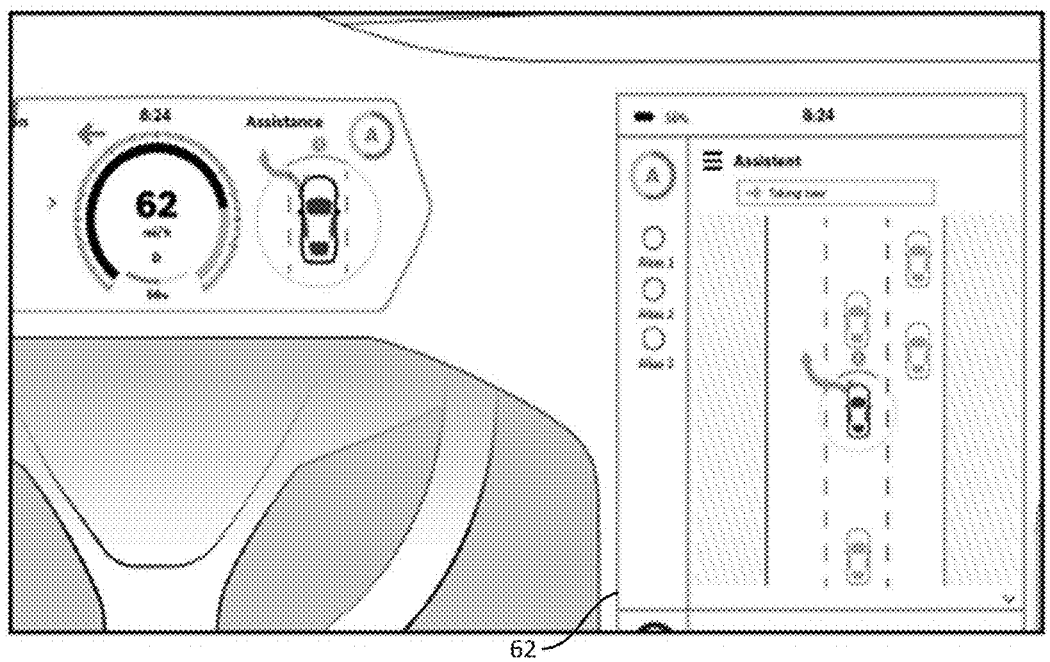
FIG. 6 illustrates an exemplary embodiment of a feedback request screen in accordance with some embodiments.

In another embodiment, the autonomous vehicle control system 10 receives driver feedback inputs in response to particular maneuvers performed by the autonomous vehicle 11. For example, as illustrated in FIG. 6, the electronic controller 12, using a feedback request screen 62, prompts for driver feedback input after autonomously performing a maneuver (e.g., overtaking another vehicle, turning, lane changes, turning at crossroads, merging into traffic at highways, and the like). The electronic controller 12 receives driver feedback input from the driver through, for example, a graphical user interface displayed by the HMI 22 on a touch screen. The electronic controller 12 uses this driver feedback input to change values such as, for example, longitudinal motion, position in the lane, acceleration, gap size (between the autonomous vehicle 11 and other vehicles), and the like.

Figure 7:
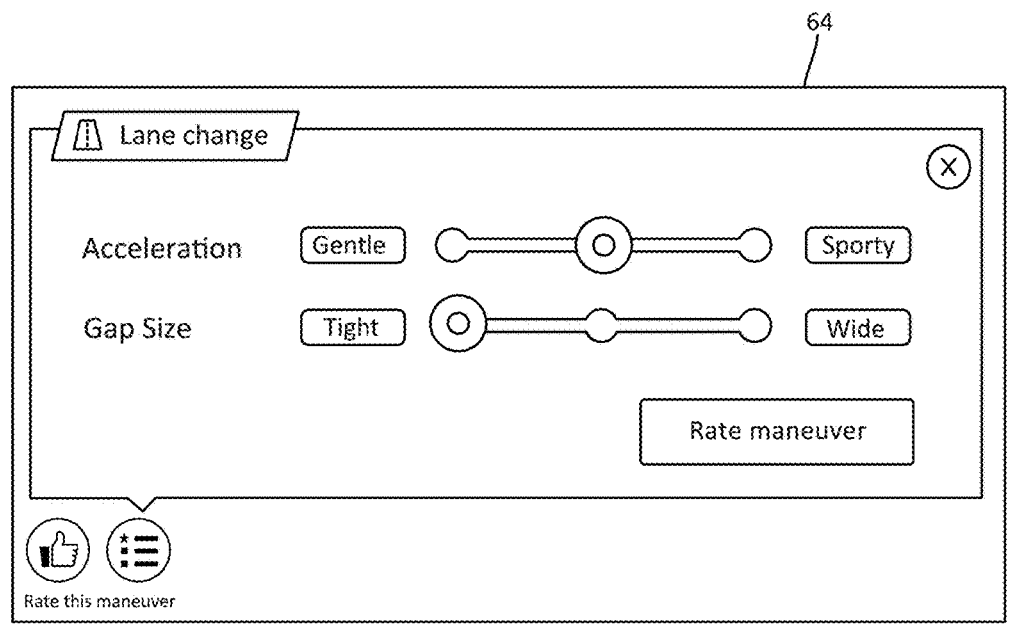
FIG. 7 illustrates an exemplary embodiment of a rating request screen in accordance with some embodiments.

In another embodiment, illustrated in FIG. 7, the electronic controller 12, using a rating request screen 64, prompts for driver rating inputs in response to particular maneuvers performed by the autonomous vehicle 11. The electronic controller 12 receives a driver rating input indicating an approval of the autonomous maneuver or a rejection of the autonomous maneuver (e.g., yes/no, thumbs up/thumbs down, etc.). The electronic controller 12 may also receive driver rating inputs rating the style of individual aspects of the maneuver (e.g., whether the acceleration should be gentler or sportier, or whether the gap size should be tighter or wider). In some embodiments, when a driver rating input indicates an approval of a maneuver, the electronic controller 12 may continue to perform the maneuver as is, with no adjustments.

In other embodiments, the electronic controller 12 may automatically modify the settings for that type of maneuver based on the driver rating inputs. For example, the electronic controller 12 may incrementally adjust the settings for the maneuver (e.g., maximum speed, maximum acceleration, maximum following distance, etc.) after each iteration of the maneuver based on the approvals or disapprovals until the preferred settings are determined. When a specific maneuver receives an approval, the electronic controller 12 performs that maneuver incrementally more aggressively (or more passively) with each iteration until the electronic controller 12 receives a disapproval, to which the electronic controller 12 responds by performing the next iteration of the maneuver using the settings that last received an approval. Accordingly, the electronic controller 12 can close in on the most preferred settings for that maneuver. In another example, the electronic controller 12 may use the received approvals and disapprovals (with or without other types of driver inputs) as inputs to a machine learning engine to determine the preferred settings for a maneuver over time.

In some embodiments, the electronic controller 12 receives a single driver input and uses the input to calculate, adjust, and optimize the settings in the driver profile 29. In other embodiments, the electronic controller 12 receives a plurality of driver inputs and uses machine learning to make adjustments to the settings in the driver profile 29.

Figure 8:
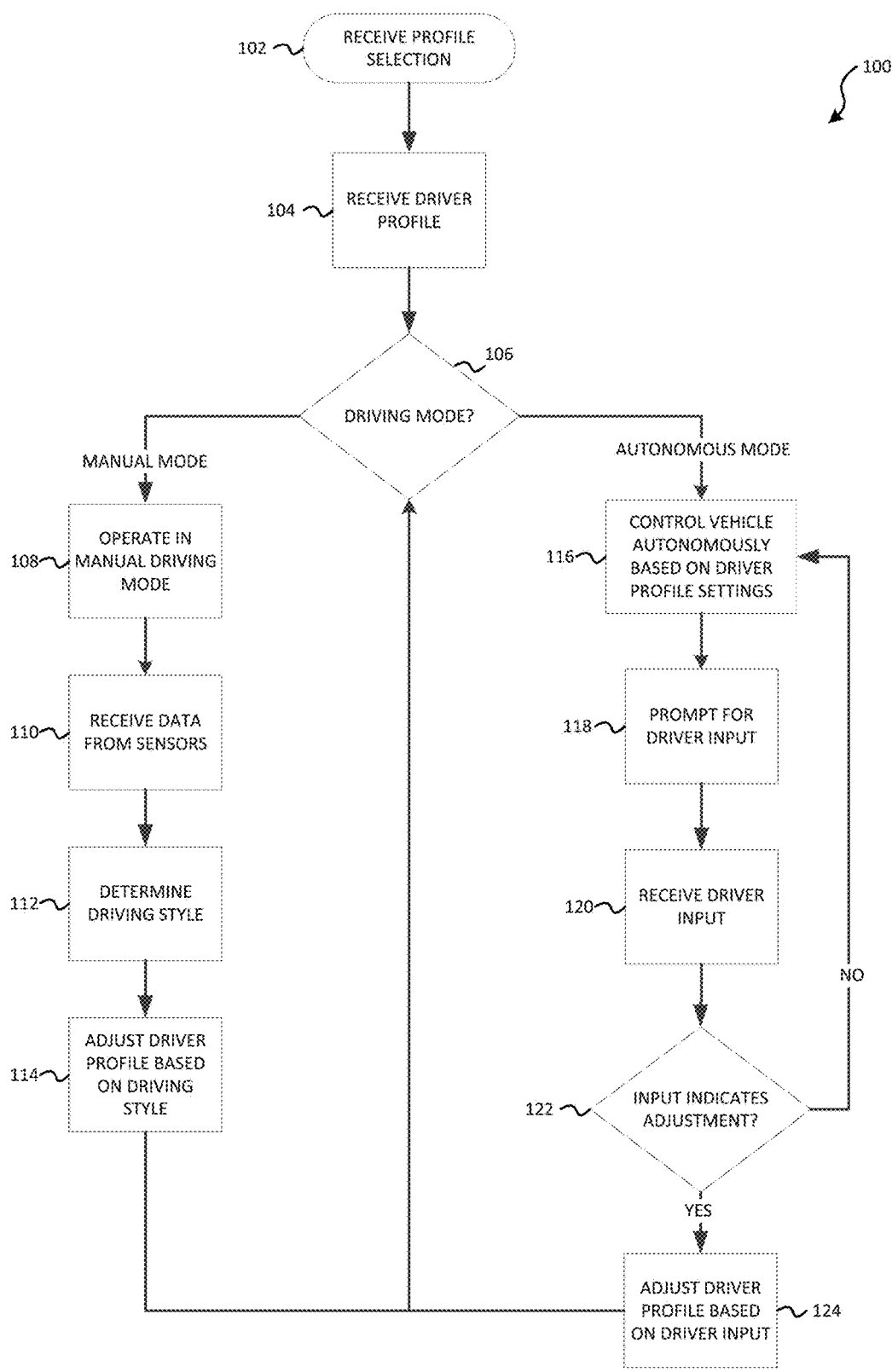
FIG. 8 is a flowchart of an exemplary method for operating an autonomous vehicle in accordance with some embodiments.

FIG. 8 illustrates one exemplary method 100 for operating the autonomous vehicle 11. The electronic controller 12 receives a profile selection (i.e., an indication of which driver profile will be used during the control of the autonomous vehicle 11) (at block 102). As described in more detail above, the profile section may be received through the profile selection screen 42 (see FIG. 3), the mobile electronic device 30, an electronic key, or a biometric identifier. When the driver profile is selected, the electronic controller 12 receives the driver profile 29 (at block 104). As noted above, the driver profile 29 may be received from the memory 26, the mobile electronic device 30, the profile server 34, or from another electronic memory accessible by the electronic controller 12.

The electronic controller 12 determines the driving mode (e.g., manual driving mode or autonomous driving mode) for the autonomous vehicle 11 (at block 106). The electronic controller 12 may determine the driving mode by receiving an input from a driver, via, for example, the HMI 22. In some embodiments, the electronic controller 12 may determine the driving mode automatically based on a default setting, a driver preference (e.g., stored in the driver profile 29), a schedule, or some other suitable mechanism.

When manual driving mode is determined (at block 108), the electronic controller 12 receives data from the sensors 16 (at block 110) as the driver manually operates the autonomous vehicle 11. As noted above, the electronic controller 12 determines a driving style based on the data (at block 112), and adjusts the driver profile 29 based on the driving style (at block 114). As illustrated in FIG. 8, in some embodiments, the electronic controller 12 continuously monitors the driver's manual driving and adjusts the driver profile accordingly (at blocks 106, 108-114).

As noted above, when the autonomous vehicle 11 is in autonomous driving mode, the electronic controller 12 autonomously controls (i.e., drives) the autonomous vehicle 11 based on the settings of the driver profile 29 (at block 116). The electronic controller 12 prompts (e.g., using the HMI 22) for one or more driver inputs (at block 118). In some embodiments, a driver input may be a driver preference input, a driver feedback input, or a driver rating input. The electronic controller 12 receives the driver input via, for example, the HMI 22 (at block 120).

As noted above, the driver input may include an indication of whether a drive approves or disapproves of a specific maneuver performed by the autonomous vehicle 11. The electronic controller 12 determines whether the driver input indicates that an adjustment should be made to the driver profile 29 (at block 122). As noted above, some driver inputs (e.g., an approval of a maneuver) may not result in an adjustment being made to the driver profile 29. In such cases, the electronic controller 12 will continue to control the autonomous vehicle 11 based on the driver profile 29 (at block 116).

When the electronic controller 12 determines that an adjustment will be made to the driver profile, the electronic controller 12 makes the adjustment (at block 124). For example, driver feedback input may be received indicating that a larger following gap is desired. The electronic controller 12 will adjust that setting in the driver profile 29, and, when operating in autonomous driving mode (at block 106) continue to control the autonomous vehicle 11 based on the driver profile 29 (as adjusted) (at block 116).

As illustrated in FIG. 8, some embodiments of the electronic controller 12 continuously adjust the driver profile 29 based on driver inputs (at blocks 106, 116-124).

Figure 9:
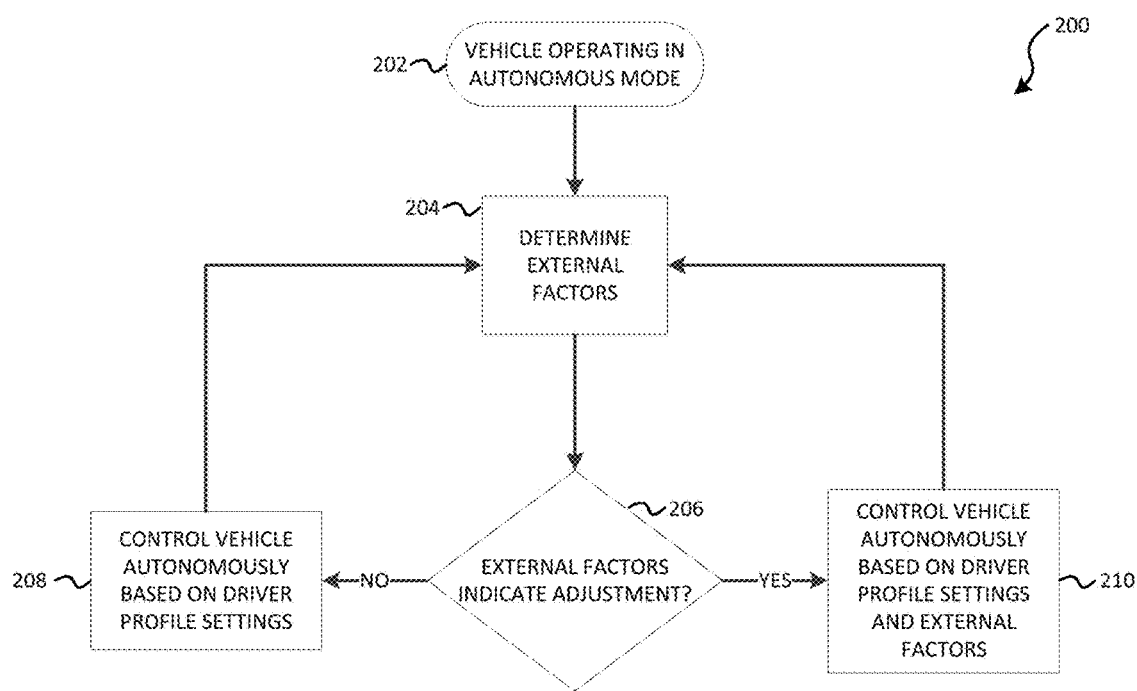
FIG. 9 is a flowchart of an exemplary method for operating an autonomous vehicle in accordance with some embodiments.

FIG. 9 illustrates one exemplary method 200 for operating the autonomous vehicle 11. In some embodiments, when the autonomous vehicle 11 is operating in autonomous mode (at block 202), the electronic controller 12 determines one or more external factors (at block 204). As noted above, external factors include weather conditions, road conditions, and driver activity. When the electronic controller determines (at block 206) that the external factors do not indicate adjustment, the electronic controller 12 continues to control the autonomous vehicle 11 autonomously based on the driver profile 29 (at block 208). For example, the electronic controller 12 may determine (e.g., using data from the sensors 16) that the road surface is dry and the weather is clear.

However, when the electronic controller determines (at block 206) that the external factors indicate adjustment, the electronic controller 12 controls the autonomous vehicle 11 autonomously based on the driver profile 29 and the external factors (at block 210). For example, the electronic controller 12 may determine (e.g., using data from the sensors 16) that the road surface is wet and the temperature is at or near freezing, and thus may control the autonomous vehicle 11 less aggressively than prescribed by the settings in the driver profile 29. In another example, the electronic controller 12 may determine that the driver is reading or writing (e.g., though an indication received by the HMI 22), and thus control the autonomous vehicle 11 to minimize any movements that tend to disturb such activities.

As illustrated in FIG. 9, whether the electronic controller 12 makes adjustments or not, the electronic controller 12 continuously determines external factors and makes adjustments accordingly (at blocks 204-210).

Thus, the invention provides, among other things, systems, and methods for operating autonomous vehicles using personalized driving profiles. Various features and advantages of the invention are set forth in the following claims.

What is claimed is:

1. A method for controlling an autonomous vehicle, the method comprising:
   receiving, with an electronic processor of the autonomous vehicle, a profile selection;
   receiving, with the electronic processor, a driver profile including a plurality of settings based on the profile selection; and
   when the autonomous vehicle is operating in an autonomous driving mode, controlling, with the electronic processor, at least one vehicle control system of the autonomous vehicle based on at least one of the plurality of settings, wherein controlling the at least one vehicle control system of the autonomous vehicle based on at least one of the plurality of settings includes
      controlling the autonomous vehicle to perform an autonomous maneuver based on the at least one of the plurality of settings;
      prompting, with the electronic processor via a human machine interface of the autonomous vehicle, for a driver input in response to completion of the autonomous maneuver;
      receiving, with the electronic processor via the human machine interface, at least one driver input after completion of the autonomous maneuver, wherein the at least one driver input includes one of a group consisting of an approval of the autonomous maneuver and a rejection of the autonomous maneuver; and
      adjusting, with the electronic processor, the at least one of the plurality of settings based on the at least one driver input.

2. The method of claim 1, wherein receiving the profile selection includes receiving the profile selection from at least one of a group consisting of a human machine interface of the autonomous vehicle, a mobile electronic device, an electronic key, and a biometric identifier.

3. The method of claim 1, wherein receiving the driver profile includes receiving the driver profile from at least one of a group consisting of a memory of the autonomous vehicle, a mobile electronic device, and a profile server.

4. The method of claim 1, further comprising:
   operating, with the electronic processor, the autonomous vehicle in a manual driving mode;

receiving, with the electronic processor, data from at least one sensor while the autonomous vehicle operates in the manual driving mode;

determining, with the electronic processor, a driving style based on the data; and adjusting, with the electronic processor, at least one of the plurality of settings based on the driving style.

5. The method of claim 4, wherein determining the driving style includes determining the driving style using at least one machine learning engine.

6. The method of claim 1, further comprising:

when the autonomous vehicle is operating in an autonomous driving mode, receiving, with the electronic processor via a human machine interface of the autonomous vehicle, at least one driver input; and adjusting, with the electronic processor, at least one of the plurality of settings based on the at least one driver input.

7. The method of claim 6, wherein receiving at least one driver input includes receiving at least one of a group consisting of a driver preference input, a driver feedback input, and a driver rating input.

8. The method of claim 1, further comprising:

determining, with the electronic processor, at least one external factor; and when the autonomous vehicle is operating in an autonomous driving mode, controlling, with the electronic processor, the at least one vehicle control system based on at least one of the plurality of settings and the at least one external factor.

9. The method of claim 8, wherein determining at least one external factor includes determining at least one from a group consisting of a weather condition, a road condition, and a driver activity.

10. A system for controlling an autonomous vehicle, the system comprising:

at least one vehicle control system;

an electronic controller electrically coupled to the at least one vehicle control system, the electronic controller including an electronic processor; and a human machine interface electrically coupled to the electronic processor, wherein the electronic processor is configured to
receive a profile selection;
receive a driver profile including a plurality of settings based on the profile selection;
control the autonomous vehicle to perform an autonomous maneuver based on at least one of the plurality of settings;
prompt, via the human machine interface, for a driver input in response to the autonomous maneuver after the autonomous maneuver has been completed;
receive, via the human machine interface, at least one driver input, wherein the at least one driver input includes one of a group consisting of an approval of the autonomous maneuver and a rejection of the autonomous maneuver; and
adjust the at least one of the plurality of settings based on the at least one driver input.

11. The system of claim 10, wherein the electronic processor is further configured to receive the profile selection from at least one of a group consisting of the human machine interface, a mobile electronic device, an electronic key, and a biometric identifier.

12. The system of claim 10, further comprising:

a memory electrically coupled to the electronic processor;

wherein the electronic processor is further configured to receive the driver profile from at least one of a group consisting of the memory, a mobile electronic device, and a profile server.

13. The system of claim 10, further comprising:

at least one sensor electrically coupled to the electronic processor;

wherein the electronic processor is further configured to
operate the autonomous vehicle in a manual driving mode;
receive data from the at least one sensor while the autonomous vehicle operates in the manual driving mode;
determine a driving style based on the data; and
adjust at least one of the plurality of settings based on the driving style.

14. The system of claim 13, wherein the electronic processor is further configured to determine the driving style using at least one machine learning engine.

15. The system of claim 10, wherein the electronic processor is further configured to
receive via the human machine interface, at least one driver input; and
adjust at least one of the plurality of settings based on the at least one driver input.

16. The system of claim 15, wherein the at least one driver input is at least one of a group consisting of a driver preference input, a driver feedback input, and a driver rating input.

17. The system of claim 10, wherein the electronic processor is further configured to
determine at least one external factor; and
when the autonomous vehicle is operating in an autonomous driving mode, control the at least one vehicle control system based on the at least one of the plurality of settings and the at least one external factor.

18. The system of claim 17, wherein the at least one external factor is at least one from a group consisting of a weather condition, a road condition, and a driver activity.

* * * * *